(12) United States Patent
Chan (10) Patent No.: US 12,328,463 B2
(45) Date of Patent: Jun. 10, 2025

(54) RESOURCE REALLOCATION METHOD AND SYSTEM FOR INFORMATION AND CONTENT DELIVERY

(71) Applicant: CHAN TSANG WONG CHU & MEE LIMITED, Hong Kong (CN)

(72) Inventor: Tai Yan Paul Chan, Hong Kong (HK)

(73) Assignee: CHAN TSANG WONG CHU & MEE LIMITED, Hong Kong (CN)

( * ) Notice: Subject to any disclaimer, the term of this patent is extended or adjusted under 35 U.S.C. 154(b) by 0 days.

(21) Appl. No.: 17/402,637

(22) Filed: Aug. 16, 2021

(65) Prior Publication Data

US 2024/0276040 A1    Aug. 15, 2024

(51) Int. Cl.
*H04N 21/24* (2011.01)
*G06Q 30/0242* (2023.01)
*H04N 21/262* (2011.01)
*H04N 21/81* (2011.01)

(52) U.S. Cl.
CPC ..... *H04N 21/2407* (2013.01); *G06Q 30/0242* (2013.01); *H04N 21/262* (2013.01); *H04N 21/812* (2013.01)

(58) Field of Classification Search
None
See application file for complete search history.

(56) References Cited

U.S. PATENT DOCUMENTS

| 7,319,976 | B1* | 1/2008 | Peckover | G06Q 30/0246 |
| | | | | 705/14.39 |
| 2007/0088817 | A1 | 4/2007 | Li | |
| 2013/0066725 | A1* | 3/2013 | Umeda | G06Q 30/0275 |
| | | | | 705/14.66 |
| 2013/0066726 | A1* | 3/2013 | Umeda | G06Q 30/0275 |
| | | | | 705/14.71 |

(Continued)

FOREIGN PATENT DOCUMENTS

| CN | 110533478 A | 12/2019 |
| WO | PCT/IB2020/059158 | 9/2020 |

OTHER PUBLICATIONS

Wilson et al., "Monetizing IMS-based IPTV through personalized advertising", Oct. 1, 2019, IEEE, 2009 International Conference on Ultra Modern Telecommunications & Workshops (2009, pp. 1-7) (Year: 2019).*

*Primary Examiner* — Davoud A Zand
(74) *Attorney, Agent, or Firm* — Muncy, Geissler, Olds & Lowe, P.C.

(57) ABSTRACT

A resource reallocation method comprising: enabling a first party to exchange for a common resource and associating it with a first content, wherein the common resource of the first party will be deducted and reallocated to other parties during consumption of the first content; enabling a second party to provide a second content for earning the common resource, wherein the common resource of the other parties will be reallocated and added to the second party during consumption of the second content; enabling a third party to exchange (Continued)

for the common resource by consumption of the first content, so as to consume the common resource by consumption of the second content during which the common resource will be reallocated from the third party to the second party; wherein consumption of time of the first content and/or the second content is counted on a per-second basis.

11 Claims, 1 Drawing Sheet

(56) References Cited

U.S. PATENT DOCUMENTS

| | | | |
|---|---|---|---|
| 2013/0080263 A1 | 3/2013 | Goldman et al. | |
| 2015/0302436 A1* | 10/2015 | Reynolds | G06Q 10/06 705/7.32 |
| 2016/0253710 A1* | 9/2016 | Publicover | H04W 4/21 705/14.66 |
| 2019/0197789 A1* | 6/2019 | Macauley | G06T 19/006 |

* cited by examiner

RESOURCE REALLOCATION METHOD AND SYSTEM FOR INFORMATION AND CONTENT DELIVERY

FIELD

The present disclosure relates to information/content delivery system, method, and apparatus, and more particularly to resource allocation/reallocation system and method for facilitating creation, production, appreciation, reward, and/or delivery of information including advertisement, media data, and/or content of specific category through computer networks.

BACKGROUND

There are various content viewing/consumption media and/or social media apps, systems and platforms, e.g., Youtube, Spotify etc. Most of them are run generally via delivery of various content including media data and advertisements inserted therebetween, but the rate of return of one or both of advertisers and content providers is usually not so satisfactory/"unfair" due to various factors. In this regard, it is desirable to have new and useful breakthrough or a reconstruction/re-establishment of rules and systems for people to adopt in existing content viewing or consumption media and/or social media apps, systems and platforms.

DISCLOSURE

According to one aspect of the present disclosure, which is a resource allocation/reallocation method for facilitating creation, production, appreciation, reward, and/or delivery of advertisement, media data, and/or content among a plurality of parties including three parties of a system preferably including an advertiser, a content provider, and a registered user/audience of the system, and the method comprising:
  enabling a first party to pay in money and exchange for a consumable, replenishable, and trackable common resource of the system based on a first exchange/payment scale and assigning/associating the paid/exchanged resource to/with a first content preferably having a predetermined on-air period of content, a predetermined category of content, and/or a predetermined target recipient or group of recipients of content; and associating consumption of the common resource with an intended package and incentive for facilitating a system consumption of the first content by other parties of the system, wherein the common resource of the first party will be deducted and reallocated to other parties during consumption of the first content;
  enabling a second party to create and provide a second content, goods, and/or service, preferably with a preset on-air period, a preset category, and/or a preset target recipient or group of recipients, on the system for earning/exchanging the common resource by redemption of a system consumption of the second content, goods, and/or service by other parties of the system based on a second exchange/charging scale, wherein the common resource of the other parties will be reallocated and added to the second party during consumption of the second content;
  enabling a third party to pay in money and exchange for the consumable, replenishable, and trackable common resource of the system based on a third exchange/payment scale, and/or enabling the third party to gain and exchange for the common resource by consumption of/watching the first content based on the intended package and incentive offered by the first party during which the common resource will be reallocated from the first party to the third party, so as to form an aggregate amount of common resource and to consume the common resource aggregated/accumulated via paying money and/or watching the first content by consumption of/watching the second content based on an intended package and incentive offered by the second party during which the common resource will be reallocated from the third party to the second party;
  wherein consumption time of the first content and/or the second content is counted by second or on a per-second basis as the system is configured to count on the actual consumption time meticulously even down to split of second, wherein the first party will be charged accordingly with consumption time of the first content by other parties, or preferably the third party, down to split of seconds; and/or the second party will be rewarded accordingly with consumption time of the second content by other parties, or preferably the third party, down to split of seconds.

In some embodiments, wherein the first content and the second content are independent of each other and adapted for consumption or viewing preferably in a respective or non-overlapping manner or a separate manner from each other by the third party for enabling reallocation of the common resources be taking place among respective parties in the system.

In other embodiments, wherein the package and the incentive provided by the first party is configured to lure other parties or the third party to watch the first content in full version so as to increase other parties' or third party's engagement with the first content and ultimately with first party's property including brand/product/service.

In further embodiments, further comprising: sending a notification to the first party when the system consumption of the first content by other parties of the system reaches a preset alert quantity and/or its common resource is reallocated and decreased to a preset value, so as to enable the first party to replenish its common resource or to end its provision of the first content when its common resource comes to zero.

In some other embodiments, further comprising: downloading the second content with a content link provided from the second party and uploading the second content to the system, and preferably conducting a content censoring for the consumption of other parties before uploading the second content.

In yet still other embodiments, further comprising: selecting an airing channel for the second content based on one or more of properties of the second content including genre, theme, and/or category.

In some other embodiments, further comprising: curating other parties to a selected airing channel or different genre of second content of the second party.

In other embodiments, further comprising: aggregating all consumption time in second of the second content and generating and sharing a content consumption report with the second party, and/or the third party in the system, wherein preferably the report is sorted by content, by date, by time slots for airing, by genders or age of the party consuming the second content for facilitating content consumption/viewing choice decision made by respective parties in the system; and/or adjusting/improving content making/production of the second party in respect of a content consumption information provided by the system; and/or feeding continuously an adjusted second content to the system on a regular basis, preferably including a weekly basis or a daily basis, with the common resources gained from other parties.

In further embodiments, further comprising: sending a reminder to the third party when its consumption of the second content reaches a preset alert quantity and/or its common resource is reallocated and decreased to a preset alert value, so as to enable the third party to replenish its common resource by consumption of the first content or paying in money to exchange more common resource for continue consumption of the second content.

In additional embodiments, further comprising: enabling the third party to stop consumption of the first content and/or second content at any time when the first content and/or the second content becoming of lesser interest to the third party and reallocation of common resource will only be taken place or effected for an exact consumption time of the first content and/or second content.

In some other embodiments, wherein reallocation of common resource between the second party and the third party might be in a predetermined ratio, including 1:1, 1:2 or 2:1; and/or the second content is configured for exchanging less common resource at the beginning to get more consumption when it is newly added to the system.

In further embodiments, wherein the first content and the second content are completely separated from each other, whereby consumption or viewing of each of them needs to be initiated or activated independently, preferably by the third party; and the consumption or viewing of one of them does not associate with another one of them; when first one of them is consumed or viewed by one of the parties, another one of them could not be consumed or viewed by the one of the parties until the one of the parties has ceased to consume or view the first one of them on one's own initiative.

According to the present disclosure, which is configured and adapted to allocate and reallocate resources for content creation, production and appreciation and to pinpoint and deconstruct the practices so as to rebuild to provide a fair, transparent and efficient method to accommodate itself to the inequality in existing media scenes, wherein a better world is realized by rewarding to every bit of efforts; even account for the duration of a split of second.

FIGURES

The present disclosure will be described by way of example with reference to the accompanying Figure, in which.

DESCRIPTION

The present disclosure relates to a revolutionary transformation in current content viewing media and/or social media apps, e.g., YouTube, etc. The present disclosure is to reconstruct the old allocation and reallocation of resources for content creation, production and appreciation and to strive for a fair, transparent and efficient method to turn around the inequality in existing media scenes. It aims to be a true leverage of new technology to better our beings.

According to the present disclosure, it appears to the inventor that migrating from the traditional standardized mass media and home TV sets to the new personalized digital platform and on-the-go smart devices; technology has brought us enjoyment breakthroughs. We could venture into different genres of contents be they niche and rare. Unfortunately, new technology is dampened by old practices. That is what we encounter at the moment. While we are enjoying the instant and boundaryless gratification of numerous infotainment/video/audio contents via social media platforms, e.g., YouTube, TikTok, Twitter, Spotify etc. and smart devices, we are still being jeopardized by old operations and logistics. Not only that, these newly emerged media platforms have become monopolies in their own sectors (e.g., YouTube monopolised the sector in movie clips, TikTok the short movie, Spotify in music etc.). These monopolies without competition can always dictate and change the rules to undermine their users, content providers and even their advertisers in order to maximise their profits. The problem becomes more and more serious as hundreds of million and growing subscribers are succumbing to this totalitarian rule without any alternatives.

Involved parties, namely Advertisers, Content Providers and Viewers/Audiences are somewhat somehow not attaining the best benefits or results out of the new technology or even worse than the old tech days. To name a few, they are still facing various problems as follows.

Advertisers: Costly and ineffective marketing approaches; Content Providers: Unfair return/reward of efforts/investment; and Audiences: Forced acceptance of intrusive advertising be it induce negative impacts.

According to the present disclosure, advertisers are not being benefited by the on-the-go digital advancement, they are still charged by new media in old ways without effectively reaching out to target customers. Most of the advertisements are still in 30-sec duration and yet viewers/ audiences nowadays can choose to click the ad off after 5-second playing but full ad time charges remained. Some advertisers knowing that their 30" TVC would not be viewed by audiences are now to cut advertisements down to 5-second which can hardly communicate anything. This in fact is worse than the old-tech days. Today there is still no way for any media platforms to guarantee that viewers will finish watching a 30 second TV commercial.

Advertisers are even blamed by their most sought-after consumers for airing intrusive advertisements in between content viewing or listening. Instead of soliciting viewers/ audiences to have positive impressions of the brand/product, marketers are paying to new media to distant consumers' acceptance of the brand. ROI could be even lower than before with the use of traditional terrestrial media.

According to the present disclosure, ample independent content providers or KOL or You-tubers while helping the media platform like You-Tube gaining huge traffics and therefore advertisers by their influx of content contribution, they do not receive a fair/balanced return of efforts. The rules of game are set by the media platforms with high thresholds and ever-changing terms and conditions. Content providers do not earn from viewership but advertisement viewing inserted into their contents. Distributions of advertisements are subject to the system's own rules and guidelines. Even the content is viewed and received good responses, the content provider may not gain from the viewership for there are a few advertisements or no advertisements allocated to the content. The recent appearance of yellow tags (no assigned advertisements) complained by quite a number of content providers in Hong Kong exemplifies the situation—good response contents do not gain any money if no advertisement is placed. This inequality of content offers and returns is rooted by the non-transparent remuneration approach controlled and altered by the media platform. On the other hand, content viewing ecology has been damaged by the intrusiveness of ads. Now ads can be cut right into the middle of a spoken sentence, or music. This is barbaric and disrespect for the content providers. Again this is worse than the old technology that at least they managed the expectation of audiences by having a commercial break after every 12-minute program viewing or playing.

According to the present disclosure, likewise the content viewers/audiences are forced to comply with the regulations set by the media platform. They are forced to endure the intrusion of advertisement inserted in the midst of the content. They are demanded to watch those intrusive advertisement if they want to monetarily support the content provider who in turn will gain a small share of the advertising dollars. Free content viewing to the audience has often been exchanged with buying the audience's attention with advertising. This is an age old practice. But where should we draw the line? In the old technology, (i.e. TV) the audience would have gotten into the habit of watching 3 minutes of ad in return for 12 minutes viewing time. Today in the new technology, there is no such rule. To the audience, ads pop in whenever they like, for whatever duration they like and in whatever frequency they like. This would not only spoil the viewing ecology but also bring the question to the audience, such as "is this fair?", "why am I being bombarded by some many times, so many ads in this program?", or the like. The audience would expect a fairer trade. At least the old technology can provide certain fairness with a fixed format of ad insertions. Could we have a solution to all those issues listed and we all really get benefits from the technology advancement?

Hence could we reconstruct the system to solve unfair issues facing by all 3 parties at one go. The answer is here. And there is one particular agent premiered and employed here via which fairness, transparency and efficiency can be depicted. And the world will become better; technology can truly reflect its merits to a better world.

According to the present disclosure, Fairness (equality) and Transparency (integrity) are two of the universal core values, and thus the inventor of the present disclosure has been striving for Fairness and Transparency, in various ways, and to realize them by imposing various systems, rules and regulations to ensure their existence and practices.

The technical solution of the present disclosure is to answer and tackle some of the malpractices created decades before and yet passed on to the present world.

The present disclosure relates to a "resources/time allocator" that uses "Time" as the "Unit of Exchange" or currency for all occasions which involves the provision/exchange of services/products that could be counted precisely and valued by "Time". To name a few: video content watching (e.g., Netflix), music/song listening (e.g., Spotify) or consumption of any kinds of contents of any format, say, ice-skating, consultation of various kinds, etc.

The merit of having time as the "Unit of Exchange" is that it is also a "fairness device" that could measure the actual servicing/consumption duration even down to split of seconds. Such a precise measurement can advocate higher effectiveness and efficiencies and resources allocation. This avoids the wastage/unfair charge of standard price set for services/consumptions, e.g., monthly content viewing subscription fee, doctor consultation, advertising spots purchase etc.

The present disclosure relates to a Fair and Transparent method/system/device that is configured to reward what people deserve; and to allocate/reallocate resources in a fair/justice manner.

In the recent decade, digital media like YouTube, Spotify, have played a significant role as a search engine, a social medium and a broadcasting platform. The reward system of these digital media, say, YouTube is quite complicated and of multiple-fold. Content providers, most of them are independent YouTubers or of small-scale operations, in order to gain the rewards/remuneration from the content viewership, need to reach the threshold set by YouTube and they can only share a small part of the advertising fees from YouTube. The threshold is high and the calculation method varies from time to time and does not have a clear formula. The return to content providers is often of a small amount unless you have a big subscriber base. From time to time, owing to some internal policy, YouTube may not assign advertisement to certain contents, hence the monetization icon changed from green to yellow. What it means is that even the content has high viewership, since there is not any advertisement allocated, the Content Provider will not be rewarded with any money or the sum could be very low. To straighten out this unfair, nontransparent situation, the present disclosure is the very solution to reward on a fair and transparent basis which sets the threshold to zero or nearly to zero or abolishes the threshold of prior art approaches and to counts every viewership by seconds or split of seconds and rewards the effort by the same measures.

Basing on this principle, the present disclosure could help on and change the scene of prior art systems/technologies, such as Netflix, Spotify, Patreon, YouTube etc.

According to the present disclosure, it is proposed to revoke the existing reward system of content providers/producers (the content could be of video format, audio format for music sharing, knowledge/skill sharing etc).

Previously, televisions and cinemas used to be the key channels of entertainment and/or infotainment. Big players dominate the market and make it quite monolithic. Well-established movie companies and giant TV stations take over cinemas and the terrestrial airtime and are the "dominating content providers".

To cite Hong Kong as an example, during Chinese New Year, a theater which is comprised of 4 mini-movie houses, was showing the same movie of different versions: 2-D English, 2-D Cantonese, 3-D English, 3-D Cantonese. Audiences simply do not have choice if they do not like the genre of the blockbuster. Some movies of lesser public attention/advertising support may only be able to squeeze into the morning session, the fringe time. With limited channels to play the movie, their investment and creativity would have gone in vain. Audiences are thus lacking the chance to get in touch of more and different genres and movies. For example, a movie might only be played in one/two cinemas in Hong Kong at the morning session on weekends even though it was full-house when screening.

Even for free terrestrial (digital) TV broadcasting, monopolistic like operations leave audiences with low quality programs for there is not any competition or the competitors are being too weak.

In Hong Kong, TVB (Television Broadcasting Ltd.) established in 1967, can be said as the ONLY player in terrestrial broadcasting market when the oldest television station, ATV, closed on Apr. 1, 2016. Other players like Viu TV (est. 2016) and Hong Kong Open TV (est. 2018) are green and with relatively low audience base.

It has always been very difficult for niche contents or independent producers to locate a channel for showing their contents and reaching out to the general mass. With restricted space and time, say, a cinema, only those titles that seem to be able to guarantee box offices would be considered. Some of the good titles without big cast of stars can only be played at fringe time, e.g., morning sessions. This is a vicious cycle that niche contents or indies could not get monetary supports from box offices and thus hinder their production and sustainability.

In the recent years, thanks to the presence of social media and the advancement of technology and smart phones, people can upload their videos and creations easily and get a free channel to reach out to audiences. Yet, for on-line channels, like YouTube or IGTV, one needs to reach a threshold, say, of over a million click rate or over 1,000 subscribers and 4,000 watch hours, to apply for Monetization, to get some mere remuneration. It was as if placing the contents there for free. For example, the revenue per view for Adsense of YouTube, upon the million click rate, might be about HK$0.0075 per click.

Even the threshold is achieved, hence the count on the number of views, the reward does not reflect the duration each audience watches the content. Say for the case of IGTV, a view is accounted if 3-second watch time is spent. It could be fewer number of audiences but each of them watches the content with more attentiveness and longer duration (engagement) while there could be huge number of watchers and they just click in and go. Hence the existing reward/remuneration system is not fair and cannot truly reflect the viewership not to mention to reward the content providers properly.

According to one aspect of the present disclosure, it is to straighten out this unfair practice, to count on the actual viewing time, not number of views only, meticulously even down to the split of second, by which the audience is charged accordingly and content providers are rewarded accordingly in the same manner. The accumulation of all the seconds of viewing time may bring positive impact on the return of investment to content providers. The more the viewing time, the more reward the content providers can obtain.

As a rewarding system proposed by the present disclosure, it exercises a fair deal of audiences and content providers; to compensate the hard work of content providers. This is especially meaningful to those low-budget or independent parties, who have been affected by their lack of financial resources and airing channels. The traditional channels, e.g., cinemas, could only cater blockbusters of deep pockets.

To reward the content providers even by split of second's viewing time whereas the other/existing digital media pays only when there are huge audiences (threshold) whereas the threshold of the present disclosure is proposed to be zero or close to zero.

Via the system of the present disclosure, after the content provider uploads the content to the medium, or the content provider shares the content with any medium, the reward system will be kicked in whenever an audience starts watching the content. The viewing time is counted, by means of the system, say, by second. Whenever the audience stops watching, the count will cease and the watching seconds will be recorded for each audience of each content. The content provider will be paid by each watching second which has a defined exchange rate of time, "Unit of Exchange" and money, e.g., 60"=1 US dollar or at whatever "exchange" rate agreed in the market between broadcasting channels and content providers and between broadcasting channels and subscribers/audiences.

Under such a system, Audiences are more willing to explore and experience new contents for they could stop at any time if they find the content is not appealing/interesting/or below their expectation. They only need to pay for the view time of the content, no more and no less. Also they could see clearly not only the number of audiences of each piece of content but also the aggregate view-time of each piece of content so as to provide them a fair measurement yardstick which piece of content is the true blockbuster or welcomed by other Audiences. This is a breakthrough as opposed to the general practice at the moment, say, for YouTube, only the number of audiences is revealed but not the stickiness of them on the content; how much time spent on watching the content. The system thus provides a transparent scene on each content provider and the performance of each piece of content.

Content providers of the proposed system of the present disclosure can also work on their weighted time scale of each content. If they want to attract people viewing their contents, they could charge on discounted view time, say one only pays 0.5 seconds for any 1 second viewed. Likewise, they could charge higher, say, 2 sec. for every 1 sec view time depending on the words of mouths and the number of viewing crowds.

With proper reward mechanism, a hundred flowers bloom. People can find room to cultivate their creativity. There could be more genres of different themes to benefit the whole media scenes. In long run, this can influence the overall culture.

Benefits to content providers with the big data obtained via the system of the present disclosure lie in that: they can easily through the system, with the access code given by the system, to check on the viewership of their respective contents with detail breakdown on the audience profiles (age, sex, countries/districts, etc.) and view-time response (how many audiences, how much watch time of specific episode) so as to understand more of the audiences' interests to better the content/production approach, etc.

According to the present disclosure, it is further configured to revoke the existing advertising system; and to gauge for higher effectiveness and efficiency.

Previously, advertisers in order to reach out to their target consumers depend a lot on successful communication via mass media. Years back, TV stations and cinemas are two major channels. But the effectiveness and efficiency of TV advertising and cinema advertising have always been uncertain for all ad placement is based on past data and speculation. Even though there could be only 1 audience viewing the ad, the advertiser is still paying the agreed full fare.

Buying time slots at TV stations or cinemas are basing on "past results" or past performances and it is always like betting on an unknown. Normally TV stations will update (increase the price)/provide their "Rate Card" each year to ask for advertisers' commitment of their advertising budget with the TV station way before the start of next year. Advertisers in order to secure the advertising rate (normally get the discount of the new rate) will discuss and agree on the commitment. The practices have been in place for decades. When advertisers are actually placing advertisements at certain spots, say, Coca-Cola to put their TVC on in June to prepare for the start of the soft drink season. Coca-Cola's media plan is basing on their understanding of each program type and thus the possible target groups and certainly the forecasted rating. There were cases that the rating of certain dramas/programs being so low that the programs were cut short without finishing the run of all episodes. Certainly there could be cases that the rating cannot be reached. Imagine the case that advertisers need to schedule their ad in advance, and they can only know about the audiences' responses and estimated viewership result after the program is aired. Once the commitment is made, regardless of the program performance, the withdrawal of advertising is quite impossible.

It is also difficult to count viewership, as only an estimation of the number of audiences of different time slots will be provided by TV stations without proper rectification. In recent years, the viewership of TV station has been dropping and losing its share to mobile/web media.

In addition, Ad time is often treated as a toilet break for most people—wastage to place ad. The importance of advertising on TV has been diminishing.

Even though TV advertising has shown its downslope, advertisers still need to bid at a higher price for prime time ad slots. To take HKTVB as an example, for a 30" TVC, its price range is from RB: HK$19,260 (US$2,470) to F15: HK$244,380 (US$31,330) each for the total population of 7.5 million people. In time of peak seasons, e.g., Christmas, etc. the first ad of TV commercial break can be outrageously high at costs. The advertiser needs to bid at the higher price in order to secure or get their desired ad space.

Traditionally 20% of the marketing budget goes to production and 80% goes to media buy for the ad placement fee is high. Now for digital media, the split is reversed to leave more budget for better creative and production. According to the present disclosure, the ratio between production and placement of advertisement might be adjusted to 1:1 or even 4:1 or above, which might enhance the quality and facilitate the creation, production, appreciation, reward of the advertisement.

Presently, for on-line or on-the-go media which is very popular and booming at the moment, they charge advertisers for their video advertising by impression and/or click. It all depends on the charging scheme of individual medium. Some may even charge for full price regardless of only 3-5" of the ad is viewed, say 30" ad air time (the duration of the ad) is charged when 3 or 5 sec of the ad is viewed. Most digital media also adopt the traditional TV break concept to put advertisements (normally 1-2 at certain viewing intervals) at the middle of the content viewing. Advertisements just pop up when audiences are watching the content. As these ads are considered as the intrusive ad in the midst of the content viewing, normally audiences will find them to be annoying (interrupting their enjoyment) and audiences tend to look for the little cross at the corner of the advertisement to shut down/exit from the ad. Instead of promoting the brand or the product, advertisers may gain negative impact by adopting this ad placement approach.

Under the proposed system of the present disclosure, ad contents and infotainment contents are separated. Both need to be activated by the users/audiences. Hence the audiences are in control of their own choices. If they opt for paying to view the infotainment, they could simply ignore the ad contents. Or, if they opt for earning the "time" to watch the content for free, they could trade in the "time" by watching ad content. Via Time-"the Unit of Exchange"; audiences can exchange their ad viewing time with content viewing time by obtaining content viewing time through watching ad. Even for the ad content, under the present disclosure, the audiences can choose their preferred/relevant ad, say, car ad, supermarket ad, etc. they like or have interest to watch. Hence advertisers under the present disclosure can have a better reach of the target audiences who are more interested in learning their product or their brand. Audiences are free to exercise their choice of "ad free viewing mode" (to pay in exchange of "Time" unit to watch the content) or "free-watch mode" (to exchange watching "Time" unit via viewing advertisements) and choice on both advertisement and program contents.

To lure the audiences for ad viewing, advertisers can employ more budget for ad creation and production and enable the ad content the infotainment content be alike; hence people will find the ad being entertaining or informative and will take time to watch them (engagement) This brand/product engagement is more of the marketing objective of advertisers to gain "impression" and "preferences" from Audiences towards their brands or products or services.

Audiences can stop viewing the ad at anytime if they find them not interesting; and Ad watching could be rewarding to users/audiences by incentivizing them to watch the advertisement via weighted scale; i.e., to provide them more content viewing time, etc.

Under the proposed system, the actual view time by an actual person will be counted; hence if 3 sec of the ad is viewed, advertisers will only be charged on 3 sec.

Hence advertisers are now under the present disclosure to pay for per-second attention of audiences. No wastage is here as opposed to the old practices.

Advertisers pay for real viewership instead of an estimated forecast basing on the previous viewership pattern.

Now advertisers can be more effectively to use the marketing dollars on creating brand building and consumer engaging advertisement with the aim to anchor people's attention on brands and products.

Now, advertisers can place more budget and efforts in making consumer-engaging communications. The budget split can be reversed to 80% for production and 20% for media for no wastage on ad placement. We only count the actual ad viewing time.

While advertisers are paying more efforts into creating ads, audiences may find the ad to be entertaining and or useful and would increase the stickiness to the ad and also the brand/product. This is another way to better the resources allocation with much efficiency and effectiveness.

According to the present disclosure, benefits to advertisers with the big data obtained via the system lie in that: they can easily through the system, with the access code given by the system, to check on the viewership of their advertisement with detail breakdown on the audience profiles (age, sex, countries/districts, etc.) to sec whether their target customers are reached and view-time response (how many audiences do view their ad in full and for how many times) so as to understand more of the audiences' interests to better the advertisement/production approach, etc. to facilitate the formulation of their overall marketing plan and customer reaching approaches.

According to a further aspect of the present disclosure, it is adapted and configured to revoke the existing payment concept of audiences; to provide more choices and flexibility to audiences.

As stated the content providers are now filled up by big players. A movie goer may not have many choices for niche contents or some small titles could not get their space in theater. When going to movies, lots of ticket buying decisions are depending on the movie critics but these do not guarantee that the movies are the ones you like and want to spend time for. There are inevitably some audiences' experiences that one finds disappointment in the movie and one just lingers on there without leaving for they consider a full ticket fare has been paid. One just wastes his time in the theater and feels ripped off if one walks out in the midst of a movie.

Likewise, even for Netflix or some on-line movies, or entertainments, one either pays a monthly fee or purchase the movie tickets, if one finds the movie/contents not that amicable or no time to consume, full fare has already been paid.

What if audiences just pay for the duration of what they watch? The system/device of present disclosure is to advocate audiences to be more explorative to content viewing for they only pay second by second for their watching duration vs. a movie ticket, Netflix program purchase or monthly fee.

Audiences can exchange view time with money and store their purchased view time in their own account set up in the system. The system using time as the "Unit of Exchange" will automatically add or subtract the view time in accordance to the adding up or the using of the "time" for various purposes.

According to another aspect of the present disclosure, it is adapted and configured to advocate transparency of viewership information to facilitate decision making of all 3 parties.

Under a fair and transparent system proposed by the present disclosure, each user is recorded in accordance to the content and the time he consumes so that content providers can be credited accordingly and the Audiences are debited also.

With such a clear record, we could have a big data base to arrive at precise information on viewership in terms of time spent on each program and audiences' profiles etc.

In light of the high transparency of time/viewership records to advertisers, content providers and audiences provided via this system, they can know how much time their ads being viewed (advertisers), how much time their contents being watched (content providers), how much time audiences (users) spend on each content; all records can be as detailed as in split of second. This would facilitate the production of ad and contents for more precise consumer information recorded. This will also help Audiences to know which content is the real hit welcomed by other Audiences in the system.

The transparency of viewership can help advertisers to see whether their ad content can attract Audiences to stay through their whole ad and who have watched their ad. This helps advertisers to correctly measure whether their target audiences (in terms of gender, age, and country/district) are reached. All data are accurate compared to the present practices of estimation and delayed reports.

Also Advertisers are paying on the "real" and "actual" and "present" vs. the previous practices of "estimation" based on the "past" using the "casting", the past viewership and audience profile to bet on the unknown possibility.

This could help the content provider to understand more on their audiences, each episode's performance, and areas for improvements etc. The learning can help the content provider to better their production quality, genre of contents, themes, anchor and guest choices, etc. The audience by the same token will be benefited to improved/quality contents for viewing.

In addition, audiences can really know which contents are the most welcomed ones rather than relying on critics or viewer number count only. The provision of such information is fair to all stakeholders in the media scenes. This would also help brand marketing, product launches to have more precise consumer response information and truly enhance consumer engagement, etc.

According to another aspect of the present disclosure, it is adapted and configured to enable application to other usages.

According to the present disclosure, all O2O activities organized by content providers or the broadcasting channels or any parties can be charged according to the time stayed/spent via the proposed system of the present disclosure.

Why one needs to pay the hairstylist the same fee while the servicing time differs? Why we cannot pay for the time we spend on the facility only but at an hourly rate or standard rate, e.g., swimming pool, gyms. Imagine we can do so via the present disclosure, the capacity of servicing could be enhanced rather than restricted.

Say when the participant is taking part in an activity or event, he activates the payment counter in Time unit when he starts the event and stops the counter when he leaves from the event. The counter will account for his enjoyment of the event/activity even as minute as a second.

According to a further aspect of the present disclosure, it is adapted and configured to propose a new payment device, which might be a kind of "timer+payment" device. To expand further, it could be a timer+payment device which can be used whenever and wherever. E.g., to beep into the ice-skating rink and count only the time staying there. To beep when start hair cutting by top stylist and only count on the cutting time. To enjoy or charge any of the services provided by slashers.

According to a further aspect of the present disclosure, it is adapted and configured to propose a Flexible Weighted Mechanism/Device, wherein there could be a defined exchange rate/ratio of time per content, and the ratio is not necessarily to be 1:1.

It enables to pay as you go. The real consumption and experiences only counts on the time/duration of the use of transportation, entertainment, consultation, services.

It also enables to alternate payment method. If this can be applied in full range, it could be widely used in different places and for different purposes.

Figure 1:
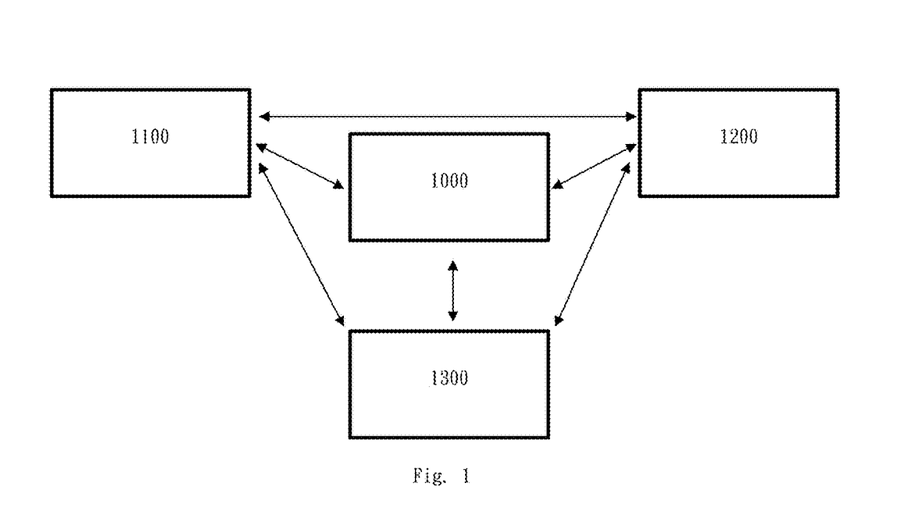
FIG. 1 is a schematic block diagram depicting an example resource reallocation system for information and content delivery according to the present disclosure.

Referring to FIG. 1, a schematic block diagram depicting an example resource reallocation system for information and content delivery according to the present disclosure is shown, wherein the system comprises a system/platform management server 1000, a first party 1100, a second party 1200, and a third party 1300 adapted and configured to operatively connect and interact with each other, such that a common resource defined, accepted and used by the system/platform and its participating parties is created and traded by, transferred to and from, shared and exchanged among, system and each of the parties via the proper control and manipulation of the management server, whereby facilitating creation, production, appreciation, reward, and/or delivery of information (particularly promotional information or advertisement), media data, and/or content of specific or desired category among the system and various parties thereof.

In some embodiments, the system/platform management server 1000 is configured to respectively and operably connect and interact with the first, the second, and the third parties 1100, 1200, 1300; and the first, the second, and the third parties 1100, 1200, 1300 are connected interactively and indirectly with each other via the system/platform management server 1000.

Figure 1A:
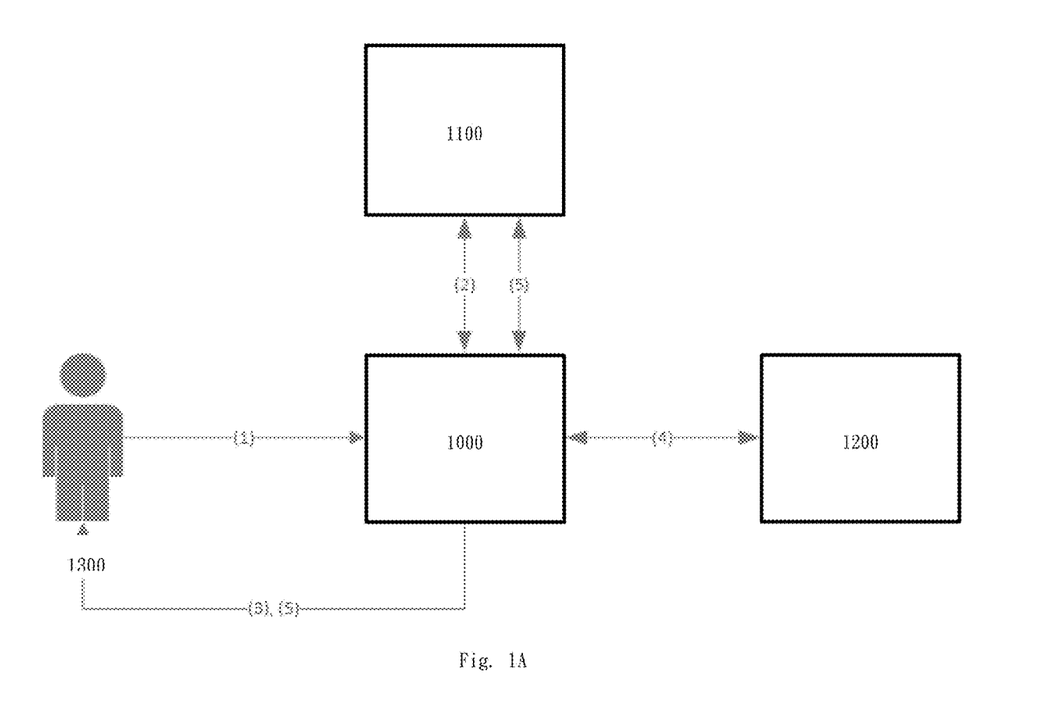
FIG. 1A is a schematic system flow block diagram of an example resource reallocation system and method for information and content delivery according to the present disclosure.

Now referring to FIG. 1A, a schematic system flow block diagram of an example resource reallocation system and method for information and content delivery according to the present disclosure is depicted, wherein the resource reallocation system comprises a system/platform management server 1000, a first party such as an advertiser configured for providing and rewarding the viewing of a promotional information 1100 via the system, a second party/content provider 1200 configured for providing and charging the viewing of desirable content 1100 via the system, and a third party/registered user of the system 1300 configured for receiving and appreciating the promotional information and/or desirable content; wherein various components of the system are adapted and configured to operatively connect and interact with each other.

The reallocation system enables an allocation/reallocation method for facilitating creation, production, appreciation, reward, and/or delivery of advertisement, media data, and/or content among a plurality of parties of the system, and the method comprising:

enabling a first party 1100 to pay in money and exchange for a consumable, replenishable, and trackable common resource of the system (step 2) preferably based on a first exchange/payment scale and assigning/associating the paid/exchanged resource to/with a first content preferably having a predetermined on-air period of content, a predetermined category of content, and/or a predetermined target recipient or group of recipients of content; and associating consumption of the common resource with an intended package and incentive for facilitating a system consumption of the first content by other parties of the system, wherein the common resource of the first party will be deducted and reallocated to other parties preferably via the system during consumption of the first content (step 5);

enabling a second party 1200 to create and provide a second content, goods, and/or service, preferably with a preset on-air period, a preset category, and/or a preset target recipient or group of recipients, on the system for earning/exchanging the common resource by redemption of a system consumption of the second content, goods, and/or service by other parties of the system (step 4) preferably based on a second exchange/charging scale, wherein the common resource of the other parties will be reallocated and added to the second party during consumption of the second content;

enabling a third party 1300 to pay in money and exchange for the consumable, replenishable, and trackable common resource of the system (step 1) preferably based on a third exchange/payment scale, and/or enabling the third party to gain and exchange for the common resource by consumption of/watching the first content (gaining the relocated common resource in step 5) based on the intended package and incentive offered by the first party during which the common resource will be reallocated from the first party to the third party, so as to form an aggregate amount of common resource and to consume the common resource aggregated/accumulated (step 3) via paying money and/or watching the first content by consumption of/watching the second content based on an intended package and incentive offered by the second party during which the common resource will be reallocated from the third party to the second party;

wherein consumption of time of the first content and/or the second content is counted by second or on a per-second basis as the system is configured to count on the actual consumption time meticulously on a per-second basis, namely even down to split of second, wherein the first party will be charged accordingly with consumption time of the first content by other parties, or preferably the third party, down to split of seconds; and/or the second party will be rewarded accordingly with consumption time of the second content by other parties, or preferably the third party, down to split of seconds.

preferably, the first content and the second content are independent of each other and adapted for consumption or viewing preferably in a respective or separate manner by the third party, which means the consumption or viewing of the first content and the second content are carried out in a separate manner or taken place in a separated non-overlapping time interval, whereby enabling reallocation of the common resource be taking place among respective parties in the system.

In some embodiments, Time is designated and used as the common resource of the system, namely Time is used as a "Unit of Exchange" in the system for all transactions, which can be very meticulous and count to the very second and even in a split second, whereby making the system be a fair one, and with such a meticulous record of data of resource, resource information can be shared to all 3 parties and thus benefit them all. As the consumption of every system content provided online, or every associated goods/service provided offline, is counted and charged on a per-second basis, it breaks down the "set" purchase concept of prior art media or content providing platform/system, such as Netflix, or cable TV, or the like.

In some embodiments, wherein the package and incentive provided by the first party is configured to lure other parties or the third party to watch the first content in full version so as to increase other parties' or the third party's engagement with the first content and ultimately with first party's property including brand/product/service.

In some other embodiments, further comprising: sending a notification to the first party when the system consumption of the first content by other parties of the system reaches a preset alert quantity and/or its common resource is reallocated and decreased to a certain value, so as to enable the first party to replenish its common resource or to end provision of the first content when its common resource comes to zero.

In further embodiments, further comprising: downloading the second content with a content link provided from the second party and uploading the second content to the system preferably after content censoring for consumption of other parties before uploading the second content.

In other embodiments, further comprising: selecting an airing channel for the second content based on one or more of properties of the second content including genre, theme, and/or category.

In yet still some other embodiments, further comprising: curating other parties to a selected airing channel or different genre of second content of the second party.

In several other embodiments, further comprising at least one of the following steps:

aggregating all consumption time in second of the second content and generating and sharing a content consumption report with the second party in the system, wherein the report is sorted by content, by date, by time slots for airing, by genders or age of the party consuming the second content; and/or adjusting/improving content making/production of the second party in respect of a content consumption information provided by the system; and/or feeding continuously an adjusted second content to the system on a regular basis, preferably including a weekly basis or a daily basis, with the common resources gained from other parties.

In some embodiments, further comprising: sending a reminder to the third party when its consumption of the second content reaches a preset alert quantity and/or its common resource is reallocated and decreased to a certain value, so as to enable the third party to replenish its common resource by consumption of the first content or paying in money to exchange more common resource for continue consumption of the second content.

In other embodiments, further comprising: enabling the third party to stop consumption of the first content and/or the second content at any time when the first content and/or the second content becoming of lesser interest to the third party and reallocation of common resource will only be taken place or effected for an exact consumption time of the first content and/or the second content.

In several embodiments, wherein reallocation of common resource between the second party and the third party might be in a predetermined ratio, including 1:1, 1:2, or 2:1; and/or the second content is configured for exchanging less common resource at beginning to get more consumption when it is newly added to the system.

As to the exchange rate, the rate for the first party or particularly the Advertiser to pay in money for the common resource of the system, i.e. Time, might be HK$2=30 sec, HK$4=1 min, or HK$240=1 hour, which means 1 sec=HK$0.067; and the rate for the second party or particularly the Content Provider to receive in money for the consumption of the second content by other parties with the common resource of the, i.e., Time, might be HK$0.5=30 sec, HK$1=1 min, or HK$60=1 hour, which means 1 sec=HK$0.0167; and the rate for the third party or particularly the Registered User/Audience to pay in money for the common resource of the system might be HK$1=30 sec, HK$2=1 min, or HK$120=1 hour, which means 1 sec=HK$0.034.

According to the present disclosure, each of the Content Providers (CP) is free to produce and provide contents to the system. The Content Provider is responsible for the content making and production, and needs to clear the involved copyright issues, etc. Hence the content provider is responsible for all the legal liabilities and copyright issues of all kinds.

In some embodiments, the Content Provider needs to sign agreement with the system on all terms and conditions including the charging/payment scale and amount, say, to charge on 1:1 or 2:1 or 1:2 etc. (1 sec air time to have 1 sec. paid, 2 sec air time to have 1 sec paid; 1 sec air time to have 2 sec paid, etc.) at HK$ x for each second; and/or to agree with the system on the airing channel basing on the genre, the theme, etc. (e.g., Professional, Lifestyle, Entertainment etc.); and/or to send the content link to the system for its downloading of the content; and the system will upload later the content at its platform for audiences' viewing.

In some embodiments, further comprising a step of having the system to promote CP contents at different media; e.g., FB, Instagram, Twitter etc., so as to attract more people to view CP contents to eventually increase the revenue of CP.

In some embodiments, further comprising a step of having the system to curate Audiences to different genre of contents of different CPs.

In some embodiments, further comprising a step of having the system to count the view time (in sec) of individual user of each content and deduct the sec from individual Audience account (time wallet).

In some embodiments, further comprising a step of having the system to aggregate all view time (in sec) of individual content and share the viewership report with CP or the CP can access to the system via access code to review the performances of his/her contents.

In some embodiments, further comprising a step of having the system to pay CP preferably by cheque or bank transfer on a monthly basis basing on the agreed payment scale mentioned above, e.g., 1:1, 2:1 or 1:2 etc. with the total view times of all Audiences.

In some embodiments, further comprising a step of having the CP to adjust/better the content making/production in respect of the viewership information provided by the system preferably sorted/classified/categorized: by content, by date, by time slots, by viewers' genders, age etc.

In some embodiments, further comprising a step of having the CP to continue feeding the contents to the system on regular basis with the resources gained from the payment of the system's registered users/audiences: weekly program or daily program.

The above cycle continues until the contract ends or not to be renewed.

According to the present disclosure, each of the registered user/Audience (U) needs to download an Apps for the system from IOS or Android for free, and needs to register at the Apps by valid phone number to open an account to purchase/trade (earn) and store watching time; wherein the watching time can be purchased via the Apps at, say, HK$2 per minute; hence HK$0.034 per sec. or to gain the watching time by watching TVC (or promotional video clips) aired on the system/platform placed by marketers/advertisers. For each second of TVC watched, Audiences will gain the very second or at certain incentive ratios granted by the advertiser and store the exchanged watching time at their registered accounts (time wallet) on the system.

The relevant flow or mechanism might be as follows:
a. User/Audience A to watch a 30-sec length TVC, and Audience A stops watching at 10-sec, such that the Advertiser via the system to allocate 10 sec watching time to the registered account Time Wallet of Audience A;
b. Audience A to watch a 30-sec length TVC, and Audience A finishes the whole TVC, such that the Advertiser via the system to pay bonus to Audience A for watching the whole TVC and to give 60-sec watching time to Audience A's registered account (The incentive can be decided by individual advertiser from double to triple or even 10 times of the watching time to encourage Audiences to watch the whole TVC) in order to engage the Audience with the Brand/Product/Service to gain positive impression on the said;
c. Audience A to purchase watching time via the system, say at the rate of HK$2 for every 60-sec; Audience A spends HK$100 for 50 minutes or 3,000-sec;
d. For a-c, Audience A thus purchase, trade in total 10-sec+60-sec+3,000 sec=3,070 sec.;
e. Audience A will store 3,070-sec. in his registered account; and f. Whenever Audience A watches Second content on the system, the system will deduct the watching time in sec. from Audience A's account, say, Audience A watches a movie for 30 minutes, hence 1,800 sec., the watching time will be deducted and added onto the movie's or CP's account. Audience A will have 1,270-sec left in his account.

In some embodiments, wherein whenever Audiences are running out of watching time, they will receive reminder from the system, or they can check on their landing page of the apps which shows clearly the watching time stored in their time wallets.

According to the present disclosure, the counting/charging by sec can enable the User to swap/stop the content viewing at any time when they find the content is of lesser interest to them and the charges will only be on those sec he has viewed.

In some embodiments, the deduction of watching time may not be in the ratio of 1:1. It all subjects to CP's preferred charges. Some content providers may like to charge less at the beginning to get more audiences for their new contents. For example, the content provider may charge half; hence 0.5 sec for every sec watched. Some content providers may charge more, say, double the charges: 2 sec. for every 1 sec viewed.

According to the present disclosure, each of the Marketers/Advertisers might sign contract with the system for airing their advertisement via the system's platform to the registered Users/Audiences, wherein the Advertisers might choose the package/incentive given to Users/Audiences; hence to lure Audiences to watch the ad in full version so as to increase Users'/Audiences' engagement with the advertisement and ultimately with brands.

In some embodiments, the advertisement airtime might, say HK$4/1 min; hence HK$0.067/sec.; and whenever the ad is viewed by any User, the advertiser might be charged accordingly with the number of second of the ad viewed by Audiences; and wherein the ad viewing time might be added onto the account/time wallet of the Audiences.

The relevant flow or mechanism might be as follows:

Advertiser A to sign contract with the system on the on-air period and with the intended package and incentives to Audiences for viewing their advertisement;

Advertiser A to pay to the system the agreed advertising budget which would be transferred into TVC Viewing Time "Time Unit" and subsequently converted into Content Viewing Time according to the package/incentive plan;

Advertiser A to send a link to the system for downloading and uploading;

Advertiser A, say, to put HK$20,000 advertising budget for the agreed package and incentive; wherein the HK$20,000 advertising budget will be transferred into 5,000 minutes or 300,000 seconds;

To provide 1:1 viewing time if Audiences do not finish watching the ad in full version. 1-sec of view time will be added onto Audiences' accounts if 1-sec of Advertiser A's TVC is viewed;

To provide 1:2 viewing time if Audiences do finish the whole TVC, and hence for the 30-sec TVC, if Audience view the full version, 60-sec view time will be gained by Audiences;

If there are 150 Audiences who in aggregate watch 1,000 sec of the TVC and yet they do not finish the full version, 1,000 sec will be deducted from Advertiser A's account of 300,000 sec. leaving it with 299,000 sec.;

If there are 150 Audiences who can finish watching Advertiser A's 30 sec TVC, all 150 Audiences will get incentive of doubling the content viewing time; hence in total 9,000 sec will be given to those 150 Audiences. The account of Advertiser A will be deducted accordingly and left with 290,000 sec; and The deduction from Advertiser A's account and the add-on to individual Audience's account will continue until Advertiser A's budget/account is used up.

In some embodiments, wherein notification will be given to Advertiser A if the sec left in his account tend to be low;  and Advertiser A can consider to top up the account for injecting new advertising dollars or to end the airing of the advertisement when the sec comes to zero.

Summing up the above, the present disclosure provides the content provider with a curated platform for better and more effective introduction of the Content to Audiences (unlike in YouTube swallowed in the big sea of videos); and provides the advertisers with a "manageable" platform with quantifiable results to achieve business objectives. Advertisement watching turns to be a meaningful exercise of collecting "seconds" in Time Wallet and trade for viewing interested programs/media content, and the Time/resources/money earned by the Audience can be reallocated in big proportion to Content Providers, whereby keeping the program running and the quality uplifted.

In other words, the present disclosure proposed a Resources Allocation/Reallocation System for respective parties admitted thereto, comprising a time calculator/allocator as time is used as a kind of currency or unit of exchange commonly acceptable to and transferrable among respective parties of the system, so as to charge or reward respective parties with their provision and consumption of respective contents, goods, and/or services.

The Resources Allocation/Reallocation System of the present disclosure is fair as consumption of respective contents is counted, charged, and/or rewarded by time on a per-second basis; wherein the system measures the actual servicing/consumption time in second/split of second and charge/reward accordingly, such that it avoids wastage/unfair charges due to standard price set for service/consumption of the prior art system.

According to the present disclosure, it benefits Content Providers by revoking the existing reward system of content providers/producers/indie productions on media. It also benefits Advertisers versus the long term doing of TV stations and even the present digital/social media in charging the advertising fee of advertiser. It even benefits users, such as audience, as they are now to pay only what they have consumed; down to the count of second under the proposed system vs. systems of various content providers including Netflix, Now TV, Cinema Houses. In some embodiments, the present disclosure benefits those users or audience who trade in or exchange accumulated time/common resource/unit of exchange stored in the system for goods or services provided or rewarded by other parties of the system, such as the advertisers or content providers. For example, the goods or services might be provided via some online/offline activities or associated O2O (online-to-offline or offline-to-online) commerce conducted by other parties of the system. In cases, the goods or services might even be transferred to or used by outsiders of the system according to preset rules observed and followed by all parties of the system.

The Resources Allocation/Reallocation System of the present disclosure is also transparent in terms of data collection and sharing. It provides with the precise measure record, such that charge and reward of servicing and consumption pattern, related consumer/consumption information becomes easily accessible and allows timely sharing and reviewing by various parties of the system.

According to the present disclosure, it benefits Content Providers as no threshold is set. Content providers of a transparent reward system can obtain fee from Users/audience who have consumed their contents. They know from the data of precise viewership measured in second and with useful information on viewers. The Advertisers will also benefit by obtaining true viewership with exact consumer profile, as well as true measure of reach and frequency (ad success measurements). In addition, Users/audience also benefit from viewership information provided with unbiased data on number of viewers and engagement time.

Further, the Resources Allocation/Reallocation System of the present disclosure is efficient in terms of data analysis and application. With the data collected, all parties can better grasp the consumers' responses and thus to revise or improve the content, goods, and/or services provided therefrom, such that system Resources can thus be more efficiently employed.

Content Providers will benefit from tracking of viewers' responses so as to improve the content and the format. Advertisers will also benefit from information gathered by the system, which enables them to measure and determine whether the marketing objectives reached or not and enable them to alter the doing with supporting figures. The Users/audience of the system could obtain the true critic by the means of the viewership report to understand what content, what format are accepted so as to make a better judgment on contents accordingly.

While the present disclosure has been described by way of example with reference to the figures, the example and figures are examples and are not to be used to restrict scope of disclosure. For example, while a smart phone has been used as an example media display device, desktop computers, laptop computers, tablet computers, smart televisions, or gaming consoles may function as media display devices without loss of generality.

The invention claimed is:

1. A resource allocation/reallocation method, comprising:
providing a management server, a first party device, a second party device and a third party device connected to each other via a network,
providing, by the first party device, a first content created by a first party, the first content being paid in money and exchanged for a consumable, replenishable, and trackable common resource or unit of exchange of the system based on a first exchange/payment scale and having a predetermined on-air/valid period of content, a predetermined category of content, and/or a predetermined target recipient or group of recipients of content; and associating consumption of the common resource with an intended package and incentive for facilitating a system consumption of the first content by other parties of the system, wherein the common resource of the first party will be deducted and reallocated to other parties during consumption of the first content;
providing, by the second party device, a second content created by a second party, with a preset valid period, a preset category, and/or a preset target recipient or group of recipients, on the system for earning/exchanging the common resource by redemption of a system consumption of the second content, goods, and/or service by other parties of the system based on a second exchange/charging scale, wherein the common resource of the other parties will be reallocated and added/credited to the second party during consumption of the second content;
transmitting, to the third party device via the network, the first content and the second content individually via the network to be viewed by the third party on the third party device, the second content being exchanged for the common resource of the system paid in money by the third party based on a third exchange/payment scale;
measuring, by the management server, a first length of time of the first content viewed on the third party device;
measuring, by the management server, a second length of time of the second content viewed on the third party device;
adjusting, by the management server, the second length of time based on the first length of time; and
deducting from or applying to an account of the third party stored in the management server the common resource according to the adjusted second length of time;
rewarding an account of the second party stored in the management server based on the common resource deducted from or applying to the account of the third party.

2. The resource allocation/reallocation method of claim 1, wherein the first content is configured to lure the third party to watch the first content in full version so as to increase other parties' or the third party's engagement with the first content and ultimately with first party's property including brand/product/service.

3. The resource allocation/reallocation method of claim 1, further comprising: sending a notification to the first party when the consumption of the first content by the third party reaches a preset alert quantity and/or its common resource is reallocated and decreased to a preset alert value, so as to enable the first party to replenish its common resource or to end its provision of the first content when its common resource comes to zero.

4. The resource allocation/reallocation method of claim 1, further comprising: downloading the second content with a content link provided from the second party device and uploading the second content to the management server after content censoring for consumption by the third party.

5. The resource allocation/reallocation method of claim 1, further comprising: selecting an airing channel for the second content based on one or more of properties of the second content including genre, theme, and/or category.

6. The resource allocation/reallocation method of claim 1, further comprising: curating the third party to a selected airing channel or different genre of second content of the second party.

7. The resource allocation/reallocation method of claim 1, further comprising: aggregating all consumption time of the second content by the third party and generating a content consumption report, wherein the report is sorted by content, by date, by time slots for airing, by genders or age of the third party for facilitating content consumption/viewing choice decision made by the third party; and/or adjusting/improving content making/production of the second party in respect of a content consumption information; and/or transmitting continuously an adjusted second content to the third party device on a regular basis, including a weekly basis or a daily basis, with the common resources gained from other parties.

8. The resource allocation/reallocation method of claim 1, further comprising: sending a reminder to the third party device when its consumption of the second content reaches a preset alert quantity and/or its common resource is decreased to a preset alert value, so as to enable the third party to replenish its common resource by additional consumption of the first content or paying in money to exchange more common resource for continue consumption of the second content.

9. The resource allocation/reallocation method of claim 1, further comprising: terminating consumption of the first content and/or the second content by the third party device at any time when the first content and/or the second content becoming of lesser interest to the third party and reallocation of common resource is taken place or effected for an exact consumption time of the first content and/or the second content.

10. The resource allocation/reallocation method of claim 1, wherein reallocation of common resource between the second party and the third party is in a predetermined ratio of 1:1, 1:2, or 2:1; and/or the second content is configured for exchanging less common resource at beginning to get more consumption when it is newly added to the management server.

11. The resource allocation/reallocation method of claim 1, wherein viewing of the first content and the second content is initiated or activated independently, on the third party device by the third party; when first one of the first content and the second content is viewed on the third party device by the third party, another one of the first content and the second content is prevented from being viewed on the third party device by the third party until the third party device has ceased to view the first one of the first content and the second content.

\* \* \* \* \*